Aug. 25, 1970  D. HOFMANN  3,525,267

CRANK DRIVE

Filed Nov. 13, 1968  7 Sheets-Sheet 1

Inventor:
DETLEF HOFMANN

By

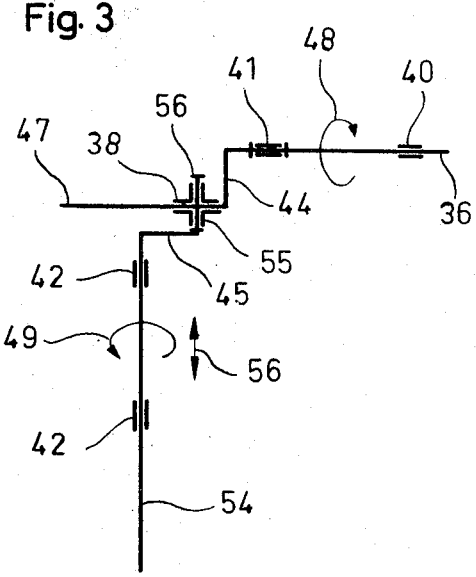
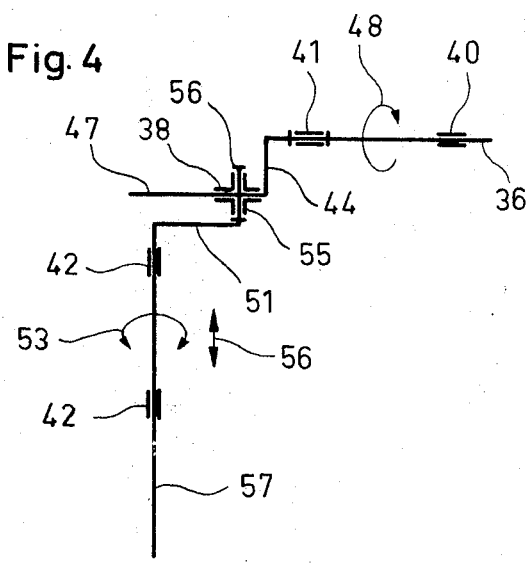

Aug. 25, 1970     D. HOFMANN     3,525,267

CRANK DRIVE

Filed Nov. 13, 1968     7 Sheets-Sheet 5

Inventor:
DETLEF HOFMANN

BY

Inventor:
DETLEF HOFMANN

United States Patent Office 3,525,267
Patented Aug. 25, 1970

3,525,267
CRANK DRIVE
Detlef Hofmann, 7531 Kieselbronn uber
Pforzheim, Germany
Filed Nov. 13, 1968, Ser. No. 775,440
Int. Cl. F16h 21/48
U.S. Cl. 74—69
12 Claims

ABSTRACT OF THE DISCLOSURE

A three-dimensional transmission with at least two shafts at a right angle with respect to each other including interconnecting joint-forming means having axes parallel to axes of the shafts for advantageous transfer of high torque movements. Diverse shafts also at right angles to at least one of the shafts lie coplanar therewith. Branch shafts located at angular position with regard to each other are always perpendicular to the transmitting shaft. A chassis and a housing rotatable with respect thereto are provided and shaft bearings are disposed in the housing at a location opposite to the chassis.

---

The present invention relates to a three-dimensional crank drive with two shafts arranged at a right angle with regard to each other and interconnected by swivel joints and/or swivel thrust joints.

According to a heretofore known transmission of the above mentioned general type with the shaft axes thereof intersecting or crossing each other at a right angle, a cranked continuous shaft is through a swivel thrust joint with three degrees of freedom coupled to a swivel thrust movable shaft. A crank arm rigidly connected to said swivel thrust movable shaft and pointing away therefrom at a right angle has its end provided with a ball of a joint which is adapted to slide in a cylindrical recess provided in a further crank arm connected to the rotating shaft. When said rotatable shaft rotates, an oscillating swivel thrust movement is imparted upon the crossing shaft or, when introducing a corresponding oscillating swivel thrust movement into the shaft pertaining thereto, the crossing shaft will rotate.

According to a further heretofore known transmission of the above mentioned type, the axes of the two shafts do not cross each other. According to this last mentioned transmission, a crank arm is likewise rigidly connected to a swivel joint movable shaft. However, this crank arm is provided with a swivel joint which is parallel to the said swivel thrust movable shaft and serves as bearing for a further linkage member which latter by means of a ball joint engages a crank arm connected to a rotating shaft. Also with this transmission, the same type of movements of the two shafts arranged at a right angle with regard to each other will be obtained. Furthermore, the input and output are exchangeable with each other. However, the manufacture of such a transmission is considerably more difficult. Both of said transmissions have the drawback that the forces which bring about the movement almost never attack at a right angle as it should be for optimum results.

According to a modification of the above mentioned transmissions, the ball joint has been replaced by a universal joint. Aside from the fact that the additional joint further complicates the manufacture, no improvement in the journalling conditions is realized because also with this transmission only in some crank bearings the forces attack at a right angle to the bearing. In addition to the above, swash disc transmissions have become known which are related to the so-called spherical transmissions. With such spherical transmissions, all axes meet each other in a joint whereby a rotary movement is converted into a pure thrust movement and vice versa. This effect is taken advantage of in transmissions used in connection with sawing, filing, grinding, etc., according to which a rotary movement is to be converted into a pushing movement. It is also known to reverse the direction in which the forces act, whereby by a reciprocatory movement, for instance of pistons reciprocated in a cylinder, a rotary movement is produced through the intervention of a swash disc transmission.

All of the above mentioned transmissions have the drawback that the forces to be transmitted generally do not act perpendicularly upon the bearing surfaces of their joints but act at an angle thereto. This results not only in an unduly high wear, but disturbances by jamming of the joints can hardly be avoided. Furthermore, such joints can already for economical reasons transmit only relatively low torques. Furthermore, one of the shafts always carries out a change in the direction of rotation at a swinging angle of a maximum of 90°.

However, in many instances it is desired to transform a rotary movement into a reciprocatory thrust movement with oscillating or continuous rotation or vice versa and at the same time to transmit considerable torques. A reciprocatory thrust movement coupled with a continuous rotation is required, for instance, of adapter transmissions serving for driving drilling chisels. Special designs of such drills or borers also require simultaneously with a reciprocatory thrust movement that the rotation is carried out in an oscillating manner which means that an oscillation about a certain angular position takes place. Such adapter transmission must be able to transmit not only high torques but must also be able to absorb the shocks and load pushes occurring during operation without being affected thereby. This can safely be realized only when the kinematic conditions of such transmission will not bring about a jamming of transmission elements so that three-dimensional crank drives of the heretofore known type are eliminated. Furthermore, such transmissions are to be employed for controlling rotary valves of pistons which carry out a reciprocatory thrust and an oscillating rotary movement. Also in this particular instance frequently extremely high torques are to be transmitted and sometime even over a very narrow space. A likewise reciprocatory thrust and rotary movement is required of an ellipse and sine function drawing device in which the torques to be transmitted are relatively low but according to which these low torques have to be transmitted without play by relatively small joints while they must be free of play even after a longer period of use.

As a further example, a differential transmission may be mentioned, in which generally rotary movements are to be equalized while such equalization could be carried out by an oscillating easily blockable rotary thrust movement by means of a three dimensional crank drive. Also such differential transmissions in which the direction of the forces may change instantly, will have to absorb not only high forces but also shock-like changes in the load.

Another example is the transmission of rotary movements by a transmission shaft carrying out an oscillating rotary thrust movement. Such transmission is to be selected when for some reasons a continuously occurring rotary movement of the transmission shaft is not permissible, or when the rotary movement is to be transmitted, some time a plurality of times, by 90° practically without play and without losses.

It is, therefore, an object of the present invention to provide a transmission of the above mentioned general type which will overcome the above outlined drawbacks.

It is another object of this invention to provide a three-dimensional transmission which will be able to transform a rotation into a rotary thrust movement which may also be a reciprocatory rotary thrust movement and to convert a reciprocatory rotary thrust movement into a rotary movement.

It is still a further object of this invention to provide a transmission as set forth in the preceding paragraph, which will be able to convey rotary movements if desired several times offset by 90°, according to which, for obtaining a higher transmission power and for a simplified production as well as for a safe operation, the forces acting upon the bearings will always act at a right angle upon the bearing surfaces.

These and other objects and advantages of the invention will appear more clearly from the following specification in connection with the accompanying drawings, in which:

FIG. 1 diagrammatically shows two rotary thrust bearings and two rotary shafts.

FIG. 2 diagrammatically shows two rotary thrust bearings, a rotary shaft and an oscillating rotary shaft.

FIG. 3 diagrammatically represents a rotary thrust bearing, a rotary bearing, a rotary shaft and a rotary thrust shaft.

FIG. 4 diagrammatically shows a rotary thrust bearing, a rotary bearing, a rotary shaft and an oscillating rotray thrust shaft.

FIG. 5 diagrammatically shows a coupling between two three-dimensional crank transmissions according to FIG. 4.

Figure 8:
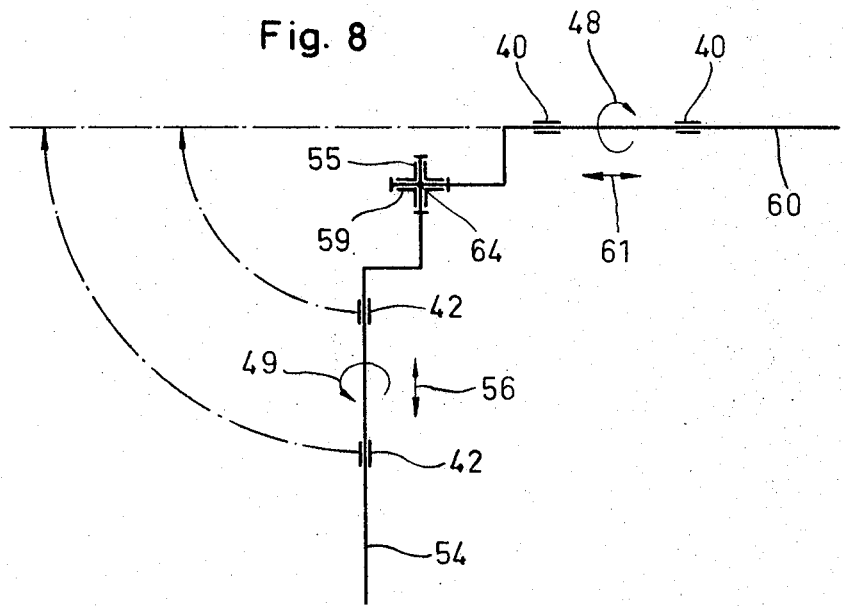

FIG. 8 diagrammatically illustrates two rotary joints which are rotatably interconnected in a direction perpendicular to their axes, and also shows two rotary thrust shafts.

Figure 9:
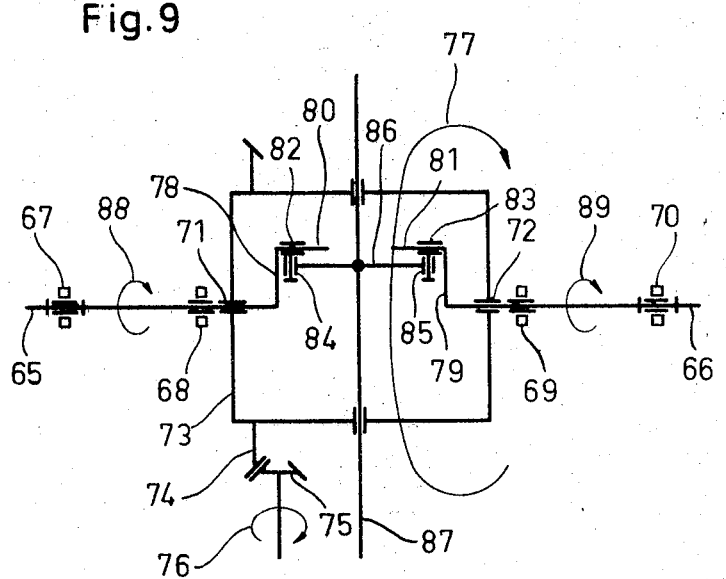

FIG. 9 is a diagrammatic illustration of a differential transmission.

Figure 10:
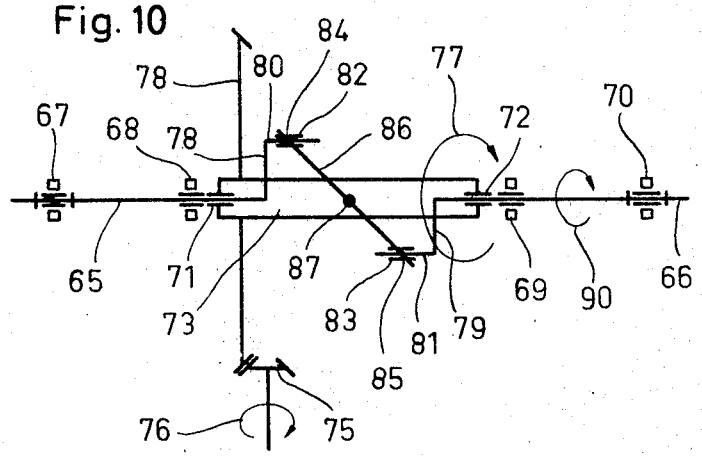

FIG. 10 illustrates the differential transmission of FIG. 9 turned by 90°.

Figure 11:
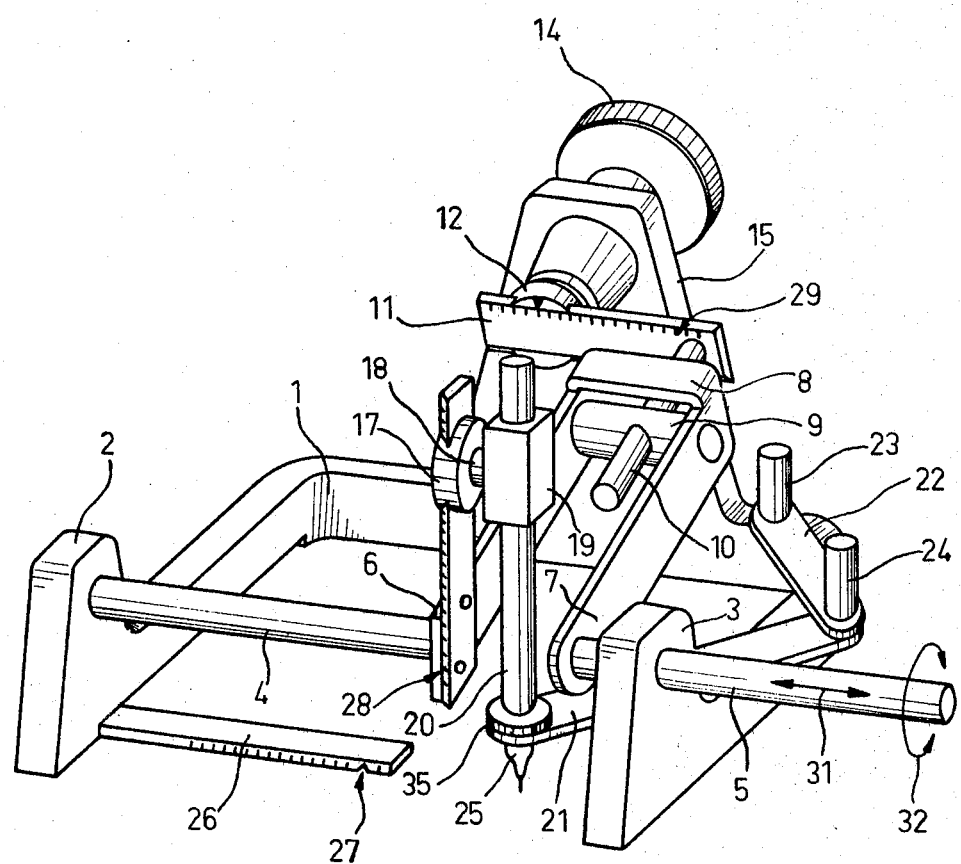

FIG. 11 is an isometric representation of an ellipse drawing device making use of the three dimensional crank transmission of FIG. 4.

Figure 12:
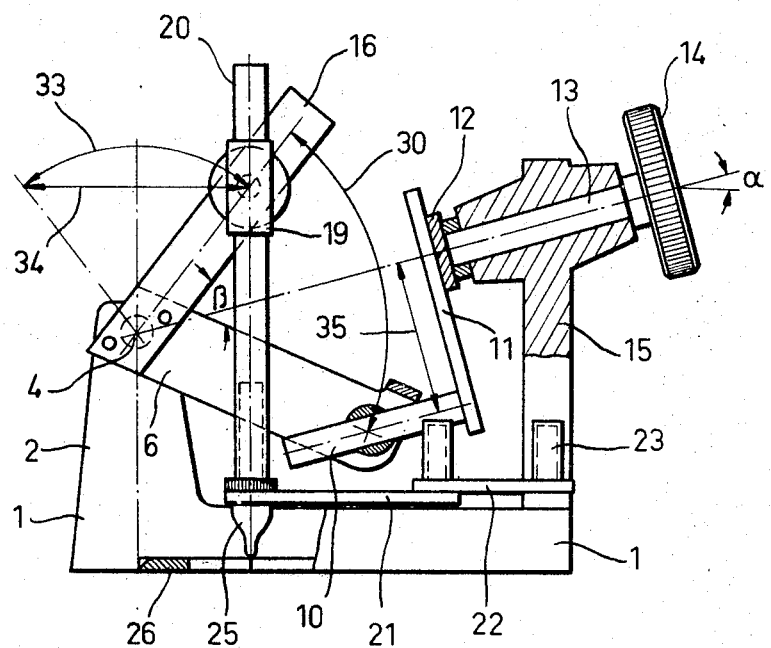

FIG. 12 shows the ellipse drawing device of FIG. 11 along a section XII—XII of FIG. 11.

Starting with a three dimensional transmission with two shafts arranged at a right angle with regard to each other and interconnected by swivel and/or swivel thrust joints, the above outlined objects have been realized by causing the axes of the joints to extend parallel to the axes of the shafts. A transmission according to the present invention thus excludes the employment of joints with three degrees of freedom. The following combinations of joints for connecting the two shafts are possible:

(a) Two swivel thrust joints.
(b) One swivel joint and one swivel thrust joint.
(c) Two swivel joints.

(a) When two swivel thrust joints are employed, a rotary shaft which is not movable in longitudinal direction will be able to produce a rotary movement in a shaft arranged at a right angle thereto. In this connection, however, two dead center positions exist, namely positions in which the direction of the driving force acting upon a lever arm points to the axis of the driven shaft. Thus, if a rotary movement is to be transmitted from a shaft rigid in longitudinal direction onto a further shaft, which is likewise rigid in longitudinal direction and is located at a right angle to said first mentioned rigid shaft, by means of a three-dimensional crank drive according to the invention with two swivel thrust joints, steps have to be taken which will overcome the two dead center point positions. Instead of the continuous rotary movement at the output, also an oscillating movement may be produced in the output shaft rigid in longitudinal direction while in case the oscillating movement is effected at an angle greater than 180°, the movement is carried ou automatically because the oppositely located dead center positions become noticeable only at an oscillating angle of 180°.

(b) When employing a swivel thrust joint and a swivel joint, the shaft carrying the swivel joint must carry out a reciprocatory thrust movement and a continuous or oscillating rotary movement if again a driving shaft is provided which is rigid in longitudinal direction and carries out a continuous rotary movement. Input and output in such three-dimensional crank drive transmissions are exchangeable with each other since the forces of the thrust or rotary movement offset with regard to each other by 90° exclude dead center point positions.

(c) If two swivel joints are employed for connecting the two shafts, both shafts must carry out an oscillating thrust movement and a continuous or oscillating rotary movement. The coupling of the two shafts is automatic as is the case when employing a swivel joint and a swivel thrust joint, which means that input and output can be exchanged without difficulties.

In each of the above mentioned instances, the transmission forces act perpendicularly upon the joint surfaces which means they avoid the drawbacks of the heretofore known three-dimensional crank drives. An advantageous design according to the present invention is obtained when at both shafts one crank each is arranged and when the crank pins of the cranks extend parallel to their respective shaft and form parts of the interconnecting joints.

If, for instance, a crank pin forms the rotary pin of a swivel thrust joint, and if the second crank pin forms the axis of rotation of a swivel joint, a particularly simple manufacture of the transmission according to example (b) will be possible. The pivot, in this instance, will engage a swivel thrust joint, in other words, a cylinder in which the pivot may turn and may also be displaced in its longitudinal direction. This cylindrical bearing again forms a swivel joint parallel to the rotary thrust movable shaft, i.e. perpendicular to the axis of the pivot, while the axes of the swivel thrust joint and of the swivel joint cross each other. The swivel axis of the swivel joint is formed by the second crank pin.

The rectangular arrangement will assure that the forces act upon the joints always perpendicularly so that the safety of operation and the life span of such transmission will not be affected by the jamming of the joints. All individual joint elements can be produced in a simple manner to the major extent by turning, since they are always arranged at a right angle with regard to each other. In this way, the drawbacks of the heretofore known transmissions have been obviated and it is possible to transmit high torques.

In certain instances, the length of the crank arms as well as the angular positions thereof are variable relative to their shaft. In this way, the oscillating movements and also the thrust movement as well as the rotary movements may be varied as to their amplitude. If, for instance, the transmission is employed in an ellipse compass, it will be possible, by the changeability according to the present invention, to rake the entire region from a point over the various ellipses up to a circle. Moreover, by varying the angular position, it is possible to move the axis of a shaft rigid in longitudinal direction about the axis of a rotary thrust movable shaft. This feature can be taken advantage of, for instance, for driving tiltable cutters or the like.

According to a further feature of the invention, by means of one of the shafts a plurality of shafts perpendicular to the first mentioned shaft are connected to each other. These further shafts may be located in one and the same plane or may in the longitudinal direction of said first mentioned shaft be spaced from each other. In the last mentioned instance, there is obtained the possibility of transmitting considerable torques by means of a rotary thrust movable shaft while the transmitting shaft carries out an oscillating rotary thrust movement and the shafts which branch off therefrom and may, for instance, be rotary shafts, are located at any desired angular position with regard to each other but always perpendicular to the transmitting shaft.

According to a preferred embodiment of this three-dimensional crank drive, at least the shafts of one pair of rotary shafts are in alignment with each other whereby independently of the oscillating rotary thrust movement there is obtained a counter rotation of the two rotary shafts.

Further possibilities of the transmission according to the invention are obtained in particular in combination with a swivel thrust or a swivel joint by the fact that the bearings of the rotary shaft or shafts and the rotary thrust movable shaft are arranged in a housing which is rotatable relative to a chassis. In this way, the transmission may also be used in a specific design as a differential transmission and, more specifically, with at least the shafts of a pair of rotary shafts in alignment with each other and with the posibility of rotating the housing about the axis of rotation of said pair of shafts. In this instance, the housing is, for instance, driven and the differential equalization between the shafts of the pair of shafts is obtained by a rotary thrust movement of the rotary thrust movable shaft. A so designed differential transmission is positive and avoids the drawbacks of a frictional power transmission and further can be produced in a simple manner mostly from parts which can be produced by turning. By means of such transmission, it is possible to transmit considerable power over a limited space, and the transmission can easily be blocked by locking the rotary thrust movable shaft. In this specific instance the housing is rotatable about one of the axes of the shafts or about the shafts which are in alignment with each other. According to a further feature of the invention, the housing may instead by rotatable about one of the axes of the joints. It is, of course, also possible to arrange both shafts which are interconnected by swivel joints in one housing and to rotate said housing, for instance, in the plane of the swivel joints. It is furthermore possible to arrange the shafts in different plane which may be variable as to distance whereby a change in the oscillating movement and, if desired, in the rotary thrust movement may be realized.

Figure 1:
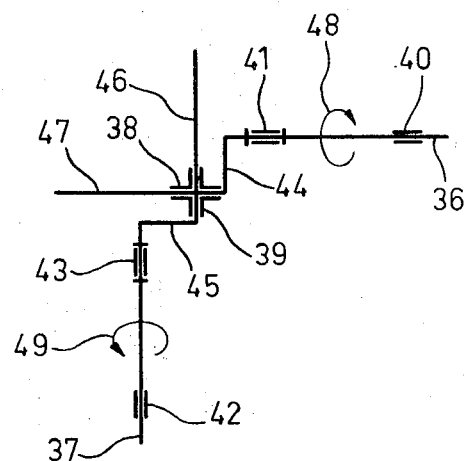
Figure 2:
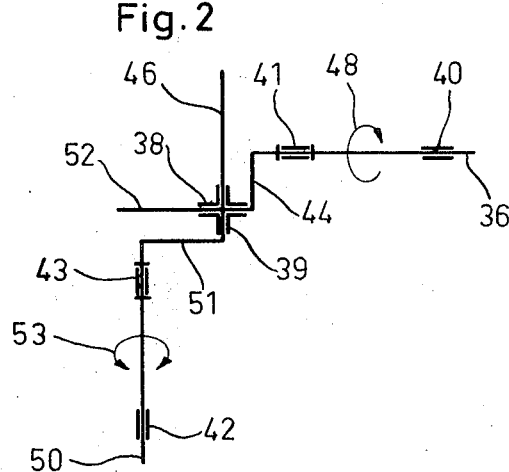
Figure 5:
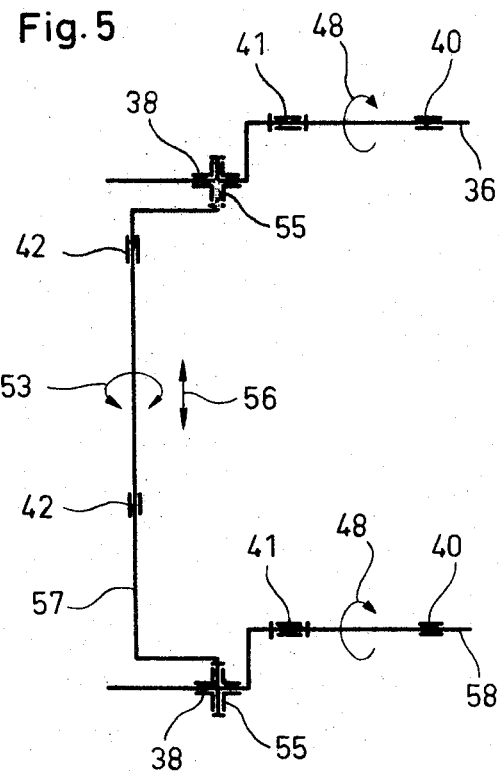
Figure 6:
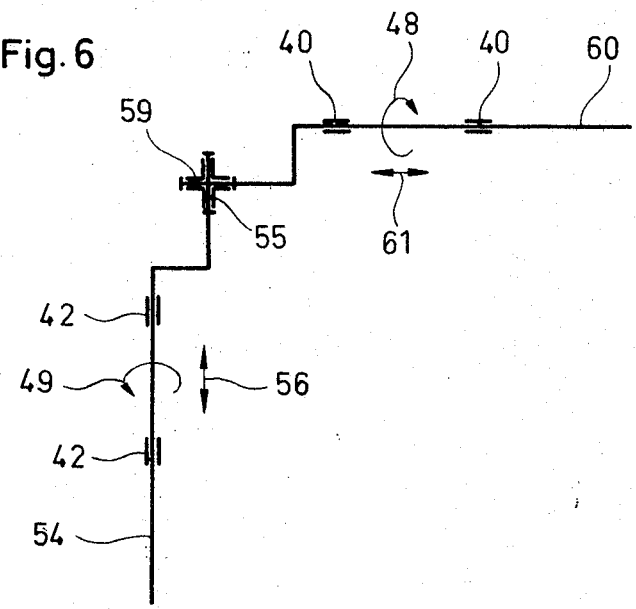
FIG. 6 is a diagrammatic representation of two rotary bearings and two rotary thrust shafts.
Figure 7:
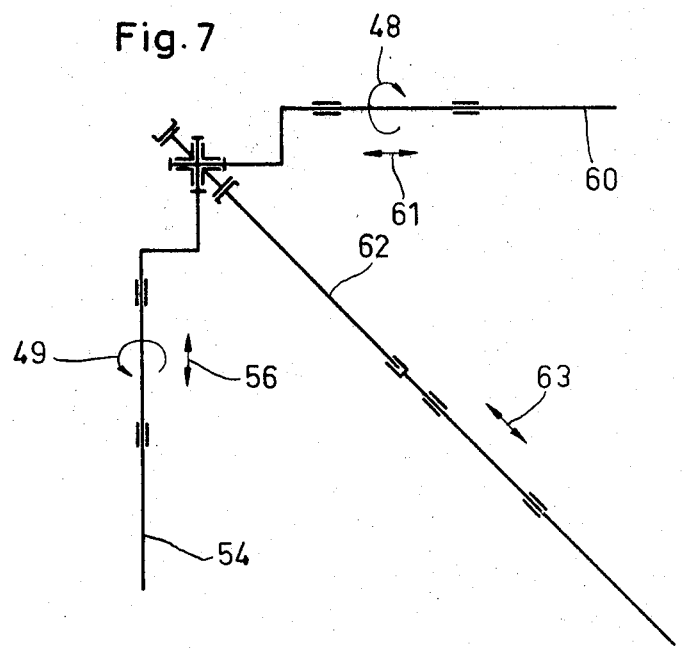
FIG. 7 shows the same three dimensional transmission as FIG. 6 but with a different drive.

Referring now to the drawings in detail, principally three joint combinations are possible according to the invention, namely (a) two swivel thrust joints as shown in FIGS. 1 and 2, (b) one swivel thrust joint and one swivel joint as shown in FIGS. 3, 4 and 5, and (c) two swivel joints as illustrated in FIGS. 6 and 7. Of course, also other coupling arrangements and other combinations as shown, for instance, in FIGS. 8 and 10, can be built up.

More specifically, a rotary shaft 36 is connected to a rotary shaft 37 by means of a rotary thrust bearing 38, 39. The two rotary thrust bearings 38, 39 are fixedly connected to each other while being arranged perpendicularly to each other. The rotary shafts 36, 37 are guided in bearings 40, 41, 42, 43 while the bearings 41, 43 prevent the shafts 36, 37 from axially displacing themselves. The ends of the shafts are provided with crank arms 44, 45 arranged at a right angle to the axes of said shafts 36, 37. The said crank arms 44, 45 are provided with crank pins 47, 46 respectively, and the crank pin 46 is parallel to the axis of the shaft 37 while the crank pin 47 is parallel to the axis of the shaft 36. When the shaft 36 rotates in the direction indicated by the arrow 48, the crank pin 47 is lifted and rotates in the bearing 38 while taking along the bearing 39 connected thereto and moving it along the crank pin 46. At the same time also the crank pin 46 is lifted so that the bearing 38 is displaced on the crank pin 47 and the rotary shaft 37 will rotate in the direction 49. After a rotation by 90°, both crank pins 46, 47 occupy their uppermost position while the crank arms 44, 45 are standing vertically. In this position, the direction of rotation of the output shaft is no longer defined or, expressed differently, the three-dimensional crank drive occupies a dead center position. This dead center position must be overcome by fly masses or similar means in order to obtain a one-directional rotation. The same dead center position will, of course, occur at the opposite extreme position following a rotation by additional 180°, which means at a position perpendicular to the drawing plane. If the input and output drive change, nothing changes with regard to the functional behavior of this transmission. A possibility of driving both shafts consists in that the bearings 38, 39 which are fixedly connected to each other are guided on an elliptic path which is located in the central plane between the two rotary shafts 36, 37. Both shafts will be rotated uniformly.

According to a further development of the three-dimentional crank transmission according to the invention with two rotary thrust bearings 38, 39, an oscillating rotary shaft 50 is equipped with a crank arm 51 which is longer than the crank arm 44 of shaft 36. If now shaft 36 is again rotated in the direction of the arrow 48, with an oscillating rotary shaft, a rotary movement is obtained the direction of which will be reversed at the extreme points of shaft 36 which means again perpendicularly to the drawing plane. The angular velocity of this rotary movement follows a sine curve because it is created by the circular movement of the crank pin 52 which latter may be shorter than the crank pin 46. With this driving type, no dead center points exist or are formed because the rotary angle of shaft 50 remains below 180°. If, however, the input and output are exchanged, also an oscillating rotary movement 53 is imparted upon the shaft 50 so that again dead center positions will be formed at the extreme positions of the shaft 36 in a plane perpendicular to the drawing plane.

FIG. 3 illustrates a three-dimensional crank drive according to which shaft 36 is connected to a rotary thrust shaft 54 by means of a rotary thrust bearing and a rotary bearing. The rotary thrust bearing 38 is mounted on the crank pin 47 and is firmly connected to the rotary bearing 55 of the crank pin 56. The crank pin 56 is perpendicularly arranged on the crank arm 45 parallel to the axis of shaft 54. When shaft 36 rotates in the direction of the arrow 48, again the output shaft 54 is rotated in the direction 49. However, at the same time shaft 54 is axially displaced. After the shaft 36 has rotated by 90°, the joint 38/35 again reaches a dead center position because the direction of rotation of shaft 54 at this area is not defined. Thus, if the direction of rotation is to be unequivocal and definite, it is necessary to provide shaft 54 with a fly mass or similar means. After a complete revolution of shaft 36, shaft 45 has at any rate carried out a thrust movement 56. The length of the thrust movement 56 depends on the diameter of the circular path as described by the crank pin 47. The stroke is thus dependent on the length of the crank arm 44 and may indirectly be varied by changing the crank arm.

The same thrust movement 56 is carried out by an oscillating rotary thrust shaft 57. The oscillating rotary movement is formed similar to the three-dimensional crank drive according to FIG. 2 by designating the crank arm 57 longer than the crank arm 44. In contrast to the three-dimensional transmission according to FIG. 3 with a rotary shaft and a rotary thrust shaft, the input and output drive are exchangeable in this transmission. Also with the three-dimensional transmission according to FIG. 3 no dead center positions are encountered when driving shaft 54 by means of a rotary thrust movement, since the dead center positions of the rotary shaft and of the thrust movement are offset with regard to each other by an angle of 90°. According to the three-dimensional crank transmission of FIG. 4, however, the dead center positions of the rotary movement of shaft 57 are not reached because also this shaft, similar to the three-dimensional transmission of FIG. 2, does not reach the rotary angle of 180°. The possibility of an exchangeable input and output may with such three-dimensional crank transmission as shown in FIG. 5 be used so that a rotary movement introduced into the shaft 36 is conveyed to a rotary shaft 38 from a rotary thrust movable shaft 57 acting as transmission shaft through the same three-dimensional crank transmission. This shaft 58 is located in a plane perpendicular to the transmission shaft 57 and therefore must not be arranged parallel to the driving shaft 36. In this way, this arrangement can be used for coupling together rotating shafts the opposite angular positions of which may be variable, while the intermediate member merely carries out an oscillating rotating thrust movement.

FIG. 6 shows the possibility of arranging two firmly interconnected swivel joints 55, 59. The shaft 60 carries out a rotary movement 48 and simultaneously carries out a thrust movement 61. This rotary thrust movement 48, 61 is conveyed to the shaft 54 through the intervention of swivel joints 59, 55 which are perpendicular to each other. Shaft 54 automatically carries out the rotary movement 49 and the thrust movement 56 pertaining thereto. Input and output are with this transmission exchangeable without any difficulties. Moreover, the transmission may, for instance, by means of a connecting rod 62 be driven when the interconnected swivel joints 55, 59 are guided on an elliptic path on the central plane between the two shafts 54 and 60. The connecting rod carries out a thrust movement 63. The dead center positions occurring at the reversing ponts of the connecting rod 62 have to be balanced by fly masses or similar means.

A further improvement of the three-dimensional crank drive according to the invention may also be brought about by connecting the two swivel joints 55, 59 with each other by a vertical rotary pin 64. With this arrangement, shaft 54 may be pivoted to such an extent that it is in alignment with shaft 60 so that both shafts carry out only a uniform rotary movement (FIG. 8).

A further specific arrangement is shown in FIGS. 9 and 10. According to these figures, two shafts 65, 66 are axially nondisplaceably guided in the bearings 67, 68, 69, 70. On the same shafts 65, 66 there is by means of bearings 71, 72 rotatably provided a housing 73. At the housing 73 there is arranged a bevel gear drive 74, 55 which by rotating in the direction 76 turns the housing in the direction 77.

Perpendicularly to the shafts 65, 66 and at the ends thereof there are arranged crank arms 78, 79. These crank ams 78, 79 are provided with crank pins 80, 81 which are parallel to the shafts 65, 66. On the crank pins 80, 81 there are arranged sliding rotary thrust bearings 82, 83 which are connected to said swivel joints 84, 85 which are perpendicular to said rotary thrust bearings 82, 83. The swivel joints 84, 83 are fixedly connected to a connecting rod 86 which in its turn is rigidly connected to a rotary thrust shaft 87.

When the housing 73 rotates in the direction of the arrow 77, the rotary thrust shaft 87 likewise carries out such movement and conveys the rotary movement through connecting rod 86, swivel joint 84, 85, rotary thrust bearing 82, 83, crank pins 80, 81 and crank arms 78, 79 to the shafts 65, 66. Thus, these shafts carry out the same rotation 88, 89 as the housing 73. If, however, one of the shafts 65 or 66 is blocked, an equalizing movement in the three-dimensional crank transmission 78–87 is effected in such a way that the total of the rotary movements of these axes remain the same. If, for instance, the shaft 65 is completely blocked, the rotary thrust shaft 87 carries out a rotary thrust movement awhile the crank pin 80 serves as a fixed bearing point.

FIG. 10 illustrates how the connecting rod 86 at a rotation of the housing 73 by 90° will have tilted while the shaft 65 was held stationary. After a further rotation by 90°, the conditions are again as illustrated in FIG. 9, but during this rotation of the housing by 180°, the shaft 66 has already rotated by 360° as indicated by the arrow 90. Of course, in this manner similar to any differential transmission, also the transmission of a this differential is made possible in a most simple manner by preventing the rotary thrust movement of the rotary thrust shaft 87 by means of a corresponding pawl.

There will now be explained a practical employment of the present invention in connection with a device which, while employing a three-dimensional crank drive according to FIG. 4, in other words a transmission which connects a rotary shaft through a swivel thrust joint and a swivel joint with an oscillating rotary thrust shaft.

Specifically referring to FIG. 11, it will be noted that at the ends of a horseshoe-shaped base frame 1 and, more specifically, in two eyes 2 and 3 thereof, there are respectively journalled axially aligned shaft sections 4 and 5 which are rotary thrust movable. The shaft ends in the interior of the base frame 1 are provided with crank arms 6, 7 which at a right angle point away from said shaft ends. The crank arms 6, 7 are rigidly connected to each other by a bridge 8. Between the ends of the crank arms 6, 7 there is provided a roller 9 having its axis parallel to the axes of the shaft sections 4, 5, said roller 9 being rotable between the ends of the crank arms 6, 7. The roller 9 is rotatably and thrust movably passed through by a crank pin 10 which is located in a plane perpendicular to the shaft sections 4, 5. The crank pin 10 is fixed to a crank slide 11 which is dovetailed and displaceable in guiding means 12. The guiding means 12 forms the closure for a shaft 13 which is centrally located on a bracket 15 mounted on the base frame 1. The shaft 13 ends in a rotable know 14. The shaft 13 together with the horizontal forms an angle α and stands vertically on the axis of the shaft sections 4, 5 or is parallel to the crank pin 10. The crank slide 11 respectively stands perpendicular on the shaft 13 or crank pin 10.

Mounted on the crank arm 6 or shaft section 4 is a dovetailed swing arm 16 which with the crank arm 6 forms an angle β, the complementary angle to the angle α for 90°. An adjusting member 17 is displaceable on the crank arm 6. Rotatably connected to the adjusting member 17 by means of a pivot 18 is a sliding member 19 in which a pipe 20 is rotatably and thrust movably guided. The lower end of pipe 20 has arranged thereon parallel guiding means 21, 22 with a fixed vertical rotary point on the base frame 1 in the vicinity of the bracket 15. The movable rotary point 24 of the parallel guiding means 21, 22 protrudes in the illustrated position of the ellipse drawing device beyond the base frame 1. A pen 25 for receiving the india ink is screwed into the point 20.

For setting the ellipse drawings device, there is provided a ruler 26 which is foldable underneath the base frame 1. This ruler 26 is provided with a notch 27 for indicating the intersection of the axis of the ellipse. For setting the ellipse drawing device there are furthermore provided scales 28 on the tiltable arm 16 and on the edge of the crank arm 6 (and 29) on the crank slide 11.

The illustrated ellipse drawing device represents a practical embodiment of the three-dimensional crank drive according to the invention in which a swivel thrust joint and a swivel joint interconnect the shafts arranged at a right angle to each other. These shafts are represented by the shaft 13 and the shaft sections 4 and 5. The said swivel thrust joint is formed by the crank pin 10 which is rotary thrust movable in the roller 9 which latter is adapted to form a swivel joint and is rotatable in the crank arms 6, 7. It is, of course, also possible to omit the second crank arm 7 and the shaft section 5 pertaining thereto whereby nothing would be changed with regard to the function of the ellipse drawing device. According to the present invention, one shaft must be rotary thrust movable and the other shaft must be rotary movable. The rotary movable shaft is the shaft 13. The rotary thrust movable shaft is represented by the shaft sections 4 and 5.

When rotating the knob 14, the crank slide 11 is moved and in its turn moves the crank pin 10 along a circle the radius 35 of which is determined by the distance of the center line of shaft 13 from the axis of the crank pin 10. Since the crank slide 11 may be displaced to such an extent that the said distance becomes zero so that the crank pin 10 and the shaft 13 will have their center line in common, a border position is obtained. When turning the shaft 13 also the crank pin 10 is turned about its longitudinal axis. In any other position, however, the crank pin 10 describes a circle of the given radius 35. While passing along said circle, the crank pin 10 takes along the roller 9 while the force for taking said roller along will at any point on said circular path act perpendicularly upon the wall of the bearing in roller 9. Since the roller 9 in its turn is rotatably journalled in the crank arms 6, 7 which in their turn are connected to the shaft sections 4, 5, the roller 9 describes an arc 30 which means is displaced on the crank pin 10 in the longitudinal direction thereof. This displacement is effected in the plane of the wall of the bearing in roller 9 and thus does not cause any load upon the bearing. Edging or jamming is impossible because the roller 9 is rotatably movably journalled between the crank arms 6, 7. During the circular movement of the crank pin 10, thus also the crank arms 6 and 7 and consequently the shaft sections 4, 5 are moved.

The shaft sections 4, 5 in this way carry out a reciprocatory movement 32. The thrust movement 31 as well as the rotary movement 32 will follow a sine function inasmuch as they are brought about by a circular movement. The stroke of said thrust movement 31 corresponds to the diameter of the circular movement of the crank pin 10. Also the magnitude 32 of the oscillating rotary movement is directly dependent on the magnitude of this circular path and can be changed only by changing the distance of the rotary movable bearing 9 from the rotary thrust movable shaft 4, 5. Since, however, this distance is non-variable in the particular embodiment illustrated, there will always exist a certain relationship of the thrust movement 31 to the oscillating rotary movement 32. If, for instance, the crank slide 11 has been displaced to such an extent that the crank pin 10 is in alignment with the shaft 13, neither a thrust nor a rotary movement will occur because the crank pin 10 will rotate in its bearing in roller 9 without moving the crank arms 6, 7. If the crank pin is displaced from this position by a displacement of the crank slide 11, it will move the roller 9 along a circular path and thereby will impart upon the shaft sections 4, 5 a rotary thrust movement which, as to its ratio, always remains the same.

This rotary thrust movement 31, 32 is transmitted to the slide member 19 by the oscillating arm 16, the adjusting member 17 and the rotary pivot 18. The slide member 19 thus carries out a circular movement about the axis of the shaft sections 4, 5 and simultaneously a movement parallel thereto. The circular movement 33 of the slide member 19 depends on the position of the adjusting member 17 on the oscillating arm 16. If the adjusting member 17 has been displaced to such an extent that the axis of the pivot 18 is in alignment with the axis of the shaft sections 4, 5 a slide member 19 will no longer carry out a circular movement 33 because the oscillating rotary movement 32 of the rotary thrust movable shaft 4, 5 will be absorbed by the bearing of the pivot 18. The slide member 19 will therefore, in such an instance, merely carry out a longitudinal movement in the direction of the axis of the shaft 4, 5 provided that the crank pin 10 is located outside the shaft 13. If, however, the adjusting member 17 is on the oscillating arm 16 moved out of the said extreme position, the slide member 19 will simultaneously carry out a circular movement 33 which is perpendicular to this longitudinal movement effected in a direction parallel to the rotary thrust movable shaft 4, 5. Since the pipe 20 is rotary thrust movably mounted in the slide member 19 and since pipe 20 is, by means of the parallel construction 21, 22 always held at the same vertical distance from the rotary thrust movable shaft 4, 5, it will be appreciated that also the ink pen 25 forming an extension of the pipe 20 will carry out a movement corresponding to the movement of the slide member 19. If the adjusting member 17 has been displaced to such an extent that the axes of pivot 18 and shaft section 4 are in alignment with each other, it will be appreciated that provided that the crank pin 10 is located outside the center of shaft 13, the ink pen 25 will write a line which will coincide with the axis of the rotary thrust movable shaft 4, 5 and will have a length corresponding to the diameter of the circle described by the crank pin 10.

If, however, the adjusting member 17 is displaced on the oscillating arm 16 to such an extent that the chord 34 of the circular movement 33 equals the diameter of the circle described by the crank pin 10, the ink pen 25 describes a circle around the center which is created by the fact that the crank slide 11 is brought into its rest position in which the crank pin 10 is in alignment with the shaft 13, while the axis of pipe 20 or the ink pen 25 points to the center. When the chord 34 or the circular movement 33 decreases by displacement of the adjusting member 17 on the oscillating arm 16 in the direction of the rotary thrust movable shaft 4, 5 while the distance 35 of the axis of the crank pin 10 from the center line of shaft 13 remains constant, the pin will described ellipses with ever decreasing axis until eventually when the axes of pivot 18 and shaft section 4 are in alignment with each other, a line will be drawn which will be driven over twice.

Since the ratio of thrust movement 31 to the oscillating rotary movement 32 of the rotary thrust movable shaft 4, 5 always remains constant and depends on the distance 35 between the axis of the crank pin 10 and the center line of the axis 13, it will be appreciated that also by changing this distance 35, ellipses can be drawn which will be of different size although the ratio between the short axis and the long axis will be maintained. This is advantageous particularly for the perspective illustration of circles or circular segments which as the case may be, may be located on different but parallel planes. The ellipse drawing device starts on the pivoted out measuring ruler 26, the notch 27 of which indicates the point of intersection of the axes of the ellipse or the center point of the circle to be drawn, whereas its measuring edge is located in the direction of the long axis of the ellipse.

The pin 25 may either after loosening the knurled screw 35 be withdrawn downwardly out of the pipe 20, or may be exchanged. It is also possible to lift off the part 22 of the parallel construction 21, 22 with the bearing bushings of the fixed and the movable pivot point 23, 24 and to tilt forwardly the entire pipe with the appended part 21 of the parallel construction 21, 22. Also, in this way it is possible to place the pin 25 into readiness for writing or to clean the same of India ink residues. In some instances a slight knock on the pen 25 by a short lifting of the pipe 20 will suffice which will be possible by the movability in longitudinal direction of the fixed pivot point 23, 24

It is also possible, for instance as an extension to the parallel construction 21, 22 to connect a pantograph to the ellipse drawing device according to the invention whereby also larger ellipses can be drawn.

It is also possible by means of the device according to the present invention to draw sine functions. To this end, it is merely necessary with the pin 18 which is in alignment with the shaft section 4 to displace the writing surface or the device in a direction perpendicular to the axis of shaft 4, 5 while simultaneously turning the knob 14. For instance, the base 1 may be provided with rollers and by means of adjustable driving members may be connected with the shaft 13. When displacing the device over the writing surface, a sine function will then be drawn with an amplitude corresponding to the adjustment of the crank slide 11 and with a length of the amplitude which corresponds to the transmission of the drive.

It is, of course, to be understood that the present invention is, by no means, limited to the particular showing in the drawings, but also comprises modifications within the scope of the appended claims.

What I claim is:

1. A crank drive comprising: a first shaft defining a first axis therewith, a second shaft connected to said first shaft and defining a second axis therewith at a right angle to said first shaft axis, and interconnecting means forming joint axes respectively parallel to said first and second shaft axes.

2. A crank drive according to claim 1, in which a crank means is disposed with each of said two shafts, and crank pins at least in part parallel to their respective shaft for said crank means and being part of said interconnecting joint-forming means.

3. A crank drive according to claim 2, in which said crank means have arm portions adjustable in length.

4. A crank drive according to claim 2, in which said crank means have arm portions rotatably and lockably disposed upon respective shafts thereof.

5. A crank drive according to claim 1, in which swing arm means are provided on at least one of said shafts, and an operation implementing device is received on said swing arm means.

6. A crank drive according to claim 1, in which said swing arm means are rotatably and lockably disposed on respective shafts thereof.

7. A crank drive according to claim 1, in which diverse shafts are connected each at a right angle to one of said shafts therewith.

8. A crank drive according to claim 7, in which said diverse shafts having right angle connection to said one shaft lie coplanar therewith.

9. A crank drive according to claim 8, in which at least one pair of shafts is in alignment.

10. A crank drive according to claim 1, in which a chassis and a housing rotatable with respect thereto are provided, and shaft bearings are disposed in said housing opposite to said chassis.

11. A crank drive according to claim 10, in which said housing is rotatable about the axis of one of said shafts.

12. A crank drive according to claim 10, in which said housing is rotatable about the axis of one of said interconnecting joint-forming means.

References Cited

UNITED STATES PATENTS

| | | | |
|---|---|---|---|
| 3,286,536 | 11/1966 | Hallmann | 74—69 |
| 2,971,489 | 2/1961 | Loser | 74—69 |

FOREIGN PATENTS

| | | |
|---|---|---|
| 666,928 | 10/1938 | Germany. |
| 457,921 | 7/1949 | Canada. |
| 485,192 | 10/1953 | Italy. |

FRED C. MATTERN, Jr., Primary Examiner

W. S. RATLIFF, Jr., Assistant Examiner

U.S. Cl. X.R.

74—63